(12) United States Patent
Pechanek et al.

(10) Patent No.: US 6,606,699 B2
(45) Date of Patent: Aug. 12, 2003

(54) MERGED CONTROL/PROCESS ELEMENT PROCESSOR FOR EXECUTING VLIW SIMPLEX INSTRUCTIONS WITH SISD CONTROL/SIMD PROCESS MODE BIT

(75) Inventors: Gerald G. Pechanek, Cary, NC (US); Juan G. Revilla, Cary, NC (US)

(73) Assignee: Bops, Inc., Mountain View, CA (US)

( * ) Notice: Subject to any disclaimer, the term of this patent is extended or adjusted under 35 U.S.C. 154(b) by 0 days.

(21) Appl. No.: 09/783,156

(22) Filed: Feb. 14, 2001

(65) Prior Publication Data
US 2001/0032303 A1 Oct. 18, 2001

Related U.S. Application Data

(63) Continuation of application No. 09/169,072, filed on Oct. 9, 1998, now Pat. No. 6,219,776.
(60) Provisional application No. 60/077,457, filed on Mar. 10, 1998.

(51) Int. Cl.[7] ................................................ G06F 15/80
(52) U.S. Cl. ............................ 712/16; 712/10; 712/20; 712/24
(58) Field of Search ............................ 712/10, 16, 20, 712/24

(56) References Cited
U.S. PATENT DOCUMENTS

| 4,783,738 A | 11/1988 | Li et al. | ............ 712/21 |
|---|---|---|---|
| 5,239,654 A | 8/1993 | Ing-Simmons et al. | ............ 712/20 |
| 5,475,856 A | 12/1995 | Kogge | ............ 712/20 |
| 5,511,212 A | 4/1996 | Rockoff | ............ 712/22 |
| 5,649,135 A | 7/1997 | Pechanek et al. | ............ 712/200 |
| 5,682,491 A | 10/1997 | Pechanek et al. | ............ 712/209 |
| 5,694,606 A | 12/1997 | Pletcher et al. | ............ 710/261 |
| 6,023,757 A | * 2/2000 | Nishimoto et al. | ............ 712/209 |
| 6,085,306 A | * 7/2000 | Takayama et al. | ............ 712/24 |
| 6,088,783 A | * 7/2000 | Morton | ............ 712/22 |

* cited by examiner

Primary Examiner—Kenneth S. Kim
(74) Attorney, Agent, or Firm—Priest & Goldstein, PLLC

(57) ABSTRACT

An apparatus for concurrently executing controller single instruction single data (SISD) instructions and single instruction multiple data (SIMD) processing element instructions comprising a combined controller and processing element. At least first and second simplex instructions each comprise a mode of operation bit, said mode of operation bit in the first simplex instruction specifying a controller SISD operation for execution by the controller, and the mode of operation bit in the second simplex instruction specifying a procesing element SIMD operation for execution by the processsing element. A very long instruction word (VLIW) contains said at least first and second simplex instructions.

3 Claims, 6 Drawing Sheets

LEGEND
WE = WRITE ENABLE

LEGEND
⇔ PE-PE INTERCONNECTION BUS*

* MAY BE IMPLEMENTED AS TWO UNI-DIRECTIONAL BUSSES OR A SINGLE BI-DIRECTIONAL BUS

MERGED CONTROL/PROCESS ELEMENT PROCESSOR FOR EXECUTING VLIW SIMPLEX INSTRUCTIONS WITH SISD CONTROL/SIMD PROCESS MODE BIT

This application is a continuation of U.S. Ser. No. 09/169,072 filed Oct. 9, 1998 U.S. Pat. No. 6,219,776 which claims benefit of Application Ser. No. 60/077,457 filed Mar. 10, 1998.

FIELD OF THE INVENTION

The present invention relates generally to improvements to array processing, and more particularly, to advantageous techniques for providing dual mode operation of a processor as both a control element for an array and as a processing element in the array.

BACKGROUND OF THE INVENTION

Separate control and processing elements are seen in a variety of parallel processing arrays. Such elements are typically dedicated to defined control or processing tasks. Various aspects of such arrangements result in overall system inefficiencies.

SUMMARY OF THE INVENTION

The present invention recognizes that typically in the prior art when a Single Instruction Multiple Data stream (SIMD) instruction is executed, only the array's Processing Element's (PE's) resources are used, except for the controller Sequence Processor's (SP's) address generation resources, and when a Single Instruction Single Data (SISD) instruction is executed, only the controller SP's resources are used thereby keeping the controller resources separate from the SIMD array resources. The present invention advantageously combines a PE and the controller SP into a single device, eliminates a dedicated PE-to-SP data bus by taking advantage of this fact, and allows the combined unit to share a single set of execution units thereby reducing implementation costs. With the present invention, an SP controller SISD instruction can be executed in parallel with a SIMD PE instruction.

These and other features, aspects and advantages of the invention will be apparent to those of skill in the art from the following detailed description taken together with the accompanying drawings.

DETAILED DESCRIPTION

Figure 1:
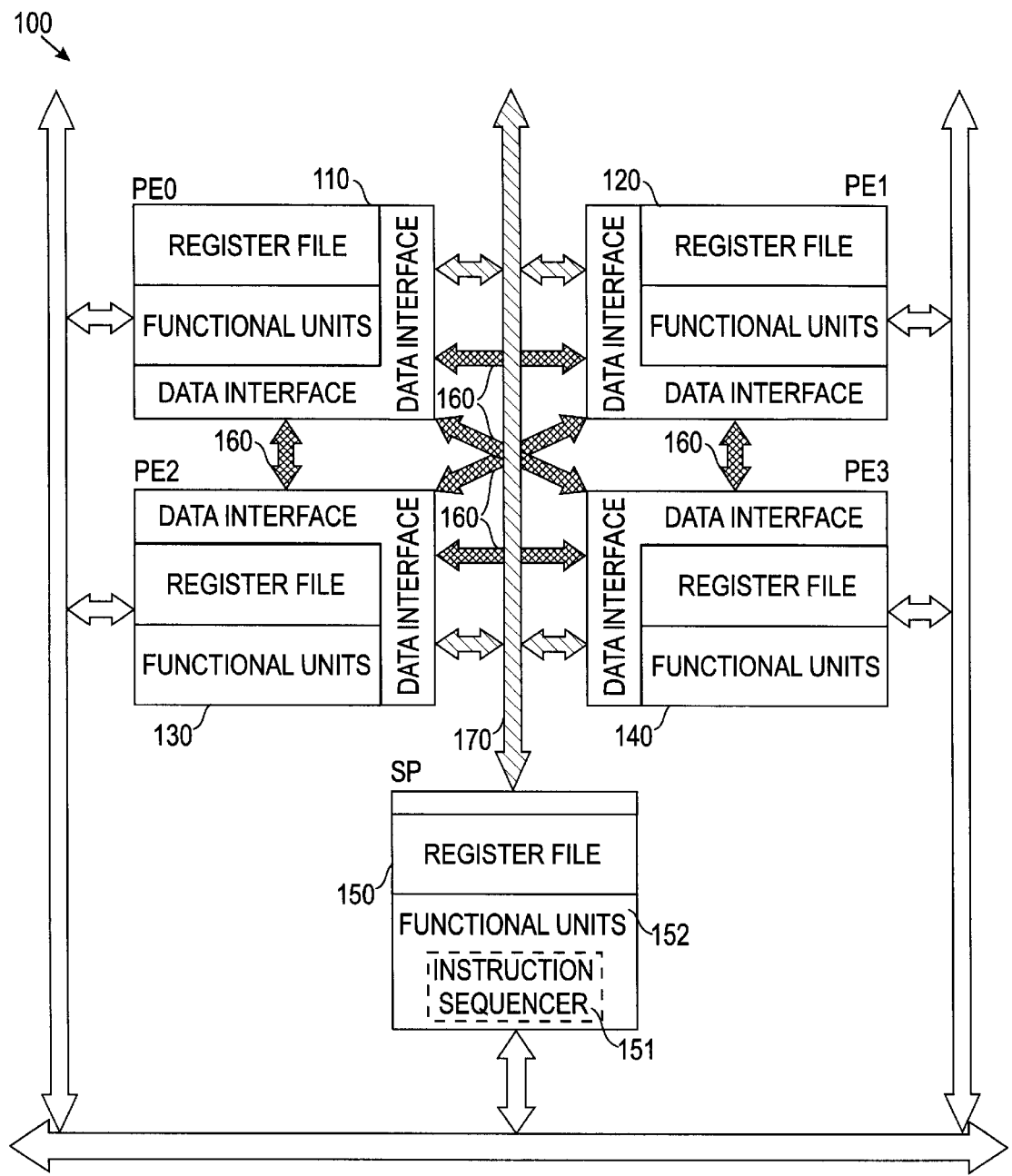
FIG. 1 illustrates an SIMD array of PEs controlled by a controller SP with a dedicated PE-to-SP data bus.

In an array 100 shown in FIG. 1, a highly parallel processor comprises an array of processing elements (PEs) 110, 120, 130 and 140, and a controller sequence processor (SP) 150. Each PE and the controller SP may include its own register file and at least one execution unit (typically an integer unit or a floating-point unit), a load/store unit, or an interconnection network between PEs. Instruction decode and control logic are also included. In addition, the controller SP also includes the hardware necessary to support instruction address generation, instruction fetching and decoding, instruction dispatching to the PE array 100 in an instruction sequencer 151 which is preferably included as one of the functional units 152 of SP 150, and to provide overall program control. The PEs rely on an interconnection network 160 to exchange data between their register files and a dedicated data bus 170 to exchange data between their register files and the controller SP's register file.

With the exception of the address generation functions, which are always performed by the controller SP, array instructions are executed on the array of PEs and control instructions in the controller SP, but not simultaneously on both in typical SIMD types of systems. More specifically, PE-parallel SIMD instructions are executed in the array of PEs and SISD instructions are executed in the controller SP. The array 100 may be adopted for use in conjunction with the present invention as described further below.

Further details of a presently preferred ManArray architecture which may be utilized in conjunction with the present invention are found in U.S. patent application Ser. No. 08/885,310, filed Jun. 30, 1997, now issued U.S. Pat. No. 6,023,753 and Ser. No. 08/949,122, now issued U.S. Pat. No. 6,023,753 and Ser. No. 08/949,122 filed Oct. 10, 1997, now issued U.S. Pat. No. 6,167,502, respectively, Provisional Application Ser. No. 60/064,619 entitled Methods and Apparatus for Efficient Synchronous MIMD VLIW Communication" filed Nov. 7, 1997, Provisional Application Ser. No. 60/067,511 entitled "Method and Apparatus for Dynamically Modifying Instructions in a Very Long Instruction Word Processor" filed Dec. 4, 1997, Provisional Application Ser. No. 60/068,021 entitled "Methods and Apparatus for Scalable Instruction Set Architecture" filed Dec. 18, 1997, Provisional Application Ser. No. 60/071,248 entitled "Methods and Apparatus to Dynamically Expand the Instruction Pipeline of a Very Long Instruction Word Processor" filed Jan. 12, 1998, Provisional Application Ser. No. 60/072,915 entitled "Methods and Apparatus to Support Conditional Execution in a VLIW-Based Array Processor with Subword Execution filed Jan. 28, 1988, and Provisional Application Ser. No. 60/088,148 entitled "Methods and Apparatus for ManArray PE-PE Switch Control" filed on Jun. 5, 1998, and Provisional Application Ser. No. 60,092, 148 entitled "Methods and Apparatus for Dynamic Instruction Controlled Reconfigurable Register File with Extended Precision" filed on Jul. 9, 1998, and Provisional Application Ser. No. 60/092,130 entitled "Methods and Apparatus for Instruction Addressing in Indirect VLIW Processors" filed on Jul. 9, 1998, all of which are assigned to the assignee of the present invention and incorporated herein by reference in their entirety.

In one aspect, the present invention provides a dynamic mode processor (DP) capable of dynamically supporting two independent modes of operation and a third unique combined mode of operation in a highly parallel processor comprising an array of processing elements. The third combined mode of operation can be used on highly parallel processors with a very long instruction word (VLIW) architecture given this invention. Dynamically changing modes of operation is defined as modes that can be changed cycle by cycle under programmer control. A combined mode of operation means that in any cycle the two independent modes of operation can be in effect governed by the indirect VLIW (iVLIW) architecture. In a first mode of operation, the DP acts as one of the processing elements in the array and participates in the execution of single-instruction-multiple-data (SIMD) instructions. In a second mode of operation, the DP acts as the controlling element for the array and executes single-instruction-single-data (SISD) instructions. In the third mode of operation, the DP acts simultaneously as the controlling element for the array and as one of the processing elements in the array. This is accomplished when the DP executes an iVLIW instruction containing a combination of SP SISD and PE SIMD type of instructions. To support these three modes of operation, in one presently preferred embodiment of the present invention, an array 200 shown in FIG. 2 includes DP 210 and PEs 220, 230 and 240. DP 210 has a plurality of execution units or functional units 211 which include an instruction sequencer 214. DP 210 also includes two general-purpose register files labeled PE register file 212 and SP register file 213, respectively. The execution units are "shared" in that they can execute instructions while the processor is in either of the first two modes of operation separately or combined in the third mode of operation. The register files are generally "not shared" in the two separate modes of operation. However, both register files are available for data communications via the array's interconnection network in either mode of operation. By allowing the use of the array's interconnection network as a direct communication path between any PE register file and the SP register file, this structure eliminates the need for a dedicated PE-to-SP data bus. With the ManArray Interconnection Network, the SP is able to broadcast data to the PEs and Receive data from individual PEs in the network. The third combined mode of operation can be obtained by intermixing SP and PE instructions in a VLIW. In this manner, the execution units can be shared between SIMD PE operations and SP SISD operations simultaneously on a cycle by cycle basis all under programmers control with no hazards of operation. This sharing of execution units represents a significant savings in implementation costs. Due to application needs it is possible to have an SP to PE Load Broadcast bus but still not require a PE to SP bus path. This is to improve concurrency of data distribution operation to the array of PEs and thereby improve performance.

Figure 2:
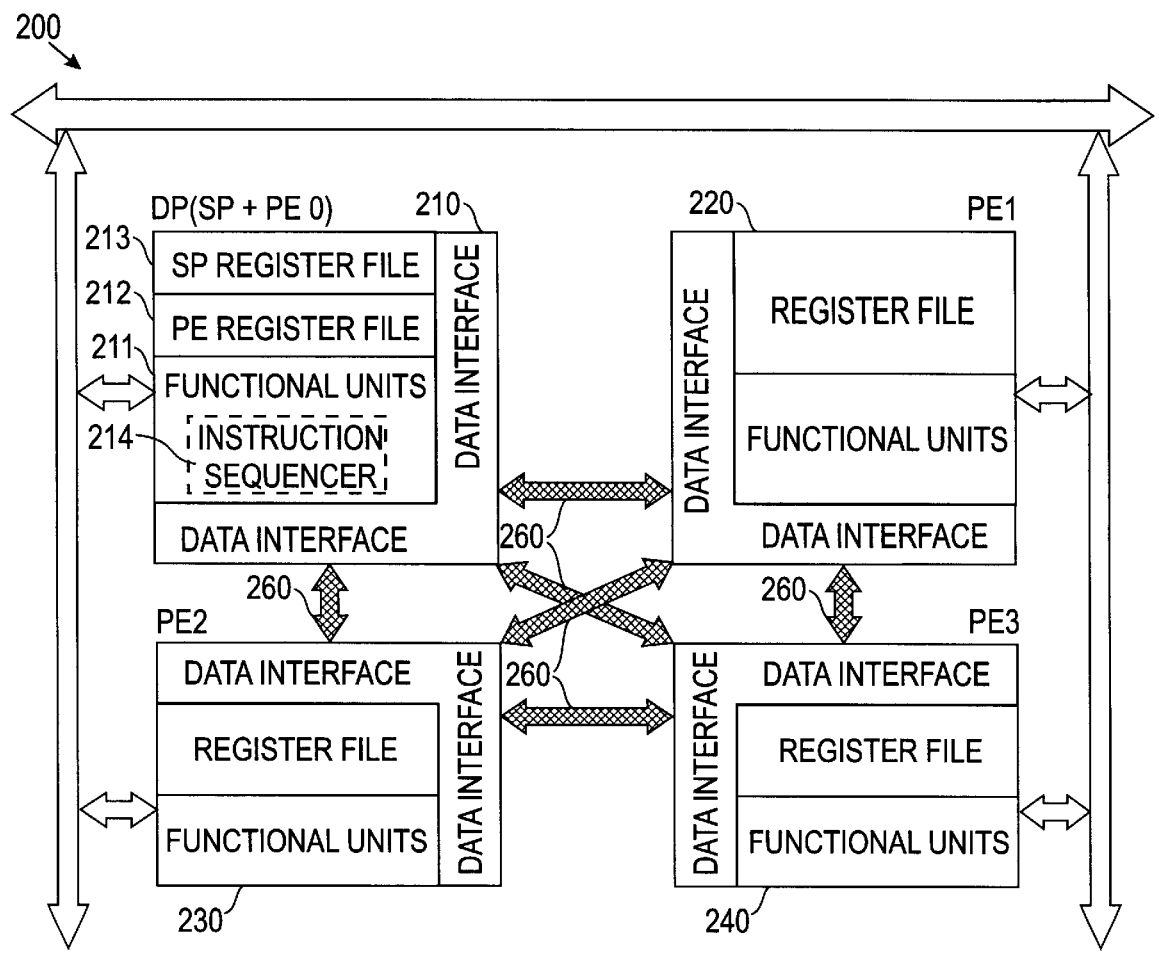
FIG. 2 illustrates a first embodiment of an array in accordance with the present invention including a dual processor and eliminating the dedicated PE-to-SP data bus of FIG. 1.
Figure 3:
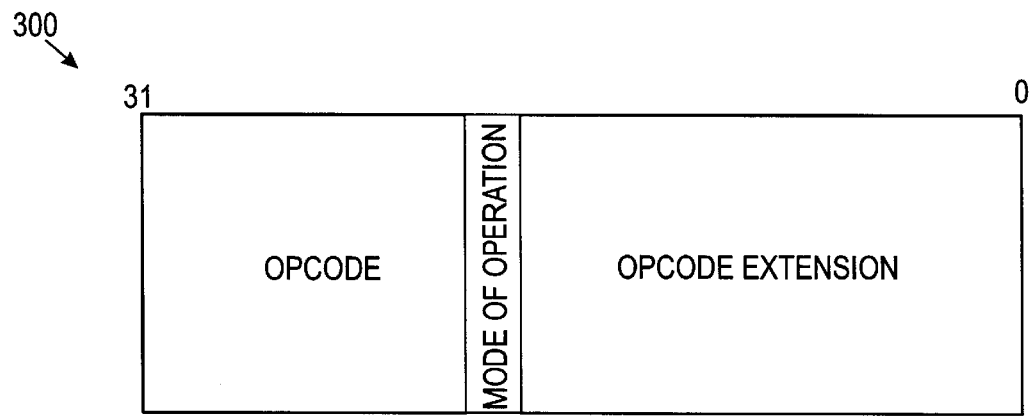
FIG. 3 illustrates an instruction format for use in conjunction with the array of FIG. 2.

Instruction processing begins with an instruction sequencer 214 in FIG. 2 of the DP fetching instructions. After each instruction is fetched, it is decoded in parallel by the DP and by each PE in the array. It is noted that an alternative exists to predecode the SP/PE bit to determine whether the instruction should be dispatched to the rest of the PEs or not. In either case and, in each device, a "mode-of-operation" bit in the instruction word is examined to determine the mode of operation (i.e. "PE" or "SP") in which the instruction should be executed. A suggested instruction format 300 is shown in FIG. 3.

If the mode-of-operation bit is set to a logic "1", a PE mode of operation is indicated. If the mode-of-operation bit is set to a logic "0", an SP mode of operation is indicated. If the PE mode of operation is indicated, every PE in the array, and the DP, acting as another processing element of the array, executes the instruction. If the SP mode of operation is indicated, only the DP, acting as the controlling element of the array, executes the instruction. In a VLIW or iVLIW processor containing multiple instructions of format 300 shown FIG. 3, the SP and PE modes of operation can be mixed producing unlimited programming flexibility within the capability of the iVLIW or the a VLIW architecture.

Figure 4:
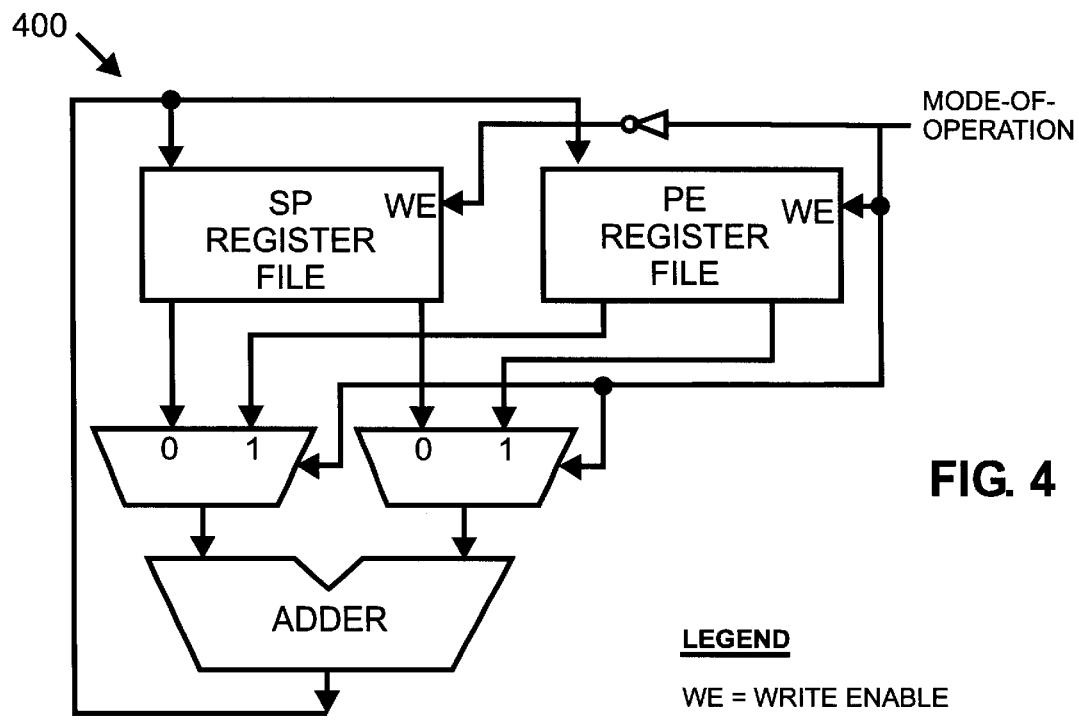
FIG. 4 illustrates a first register file selection mechanism in accordance with the present invention.

When an instruction is decoded in the DP, the mode-of-operation bit is also used to select which register file is used for the operation. For instance, if the instruction is an integer ADD instruction, the mode-of-operation bit is used to determine the register file in which the source and destination registers are located. A logical view of the register file selection mechanism 400 is illustrated in FIG. 4.

Figure 5:
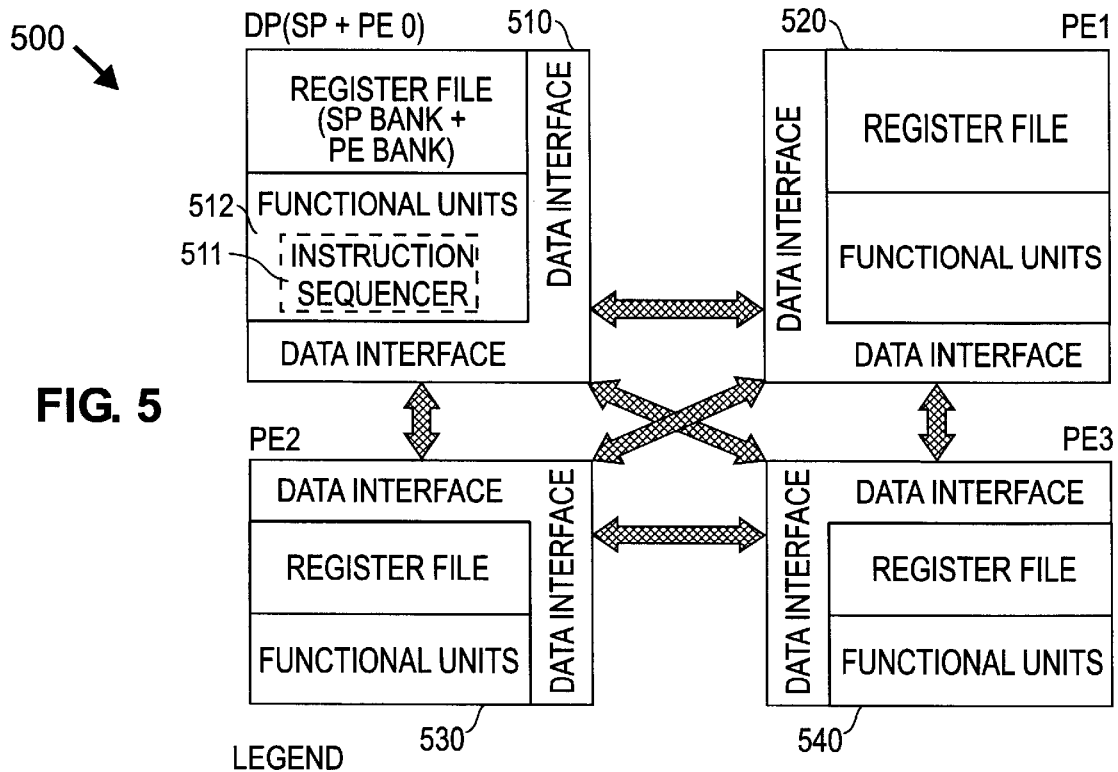
FIG. 5 illustrates a second embodiment of an array in accordance with the present invention.

In a second embodiment of the present invention shown in FIG. 5, an array 500 includes a DP 510 and PEs 520, 530 and 540. The DP 510 includes a plurality of execution units and a single general-purpose register file. The execution units are "shared" in that they can execute instructions while the processor is in either mode of operation. The register file is divided into two banks, a PE bank and an SP bank, where the two banks are generally "not shared" in the two separate modes of operation. However, both banks are available for data communications in either mode of operation via the array's interconnection network, enabling the exchange of data between PEs or a PE and the SP.

Instruction processing begins with an instruction sequencer 511 which is a part of the functional units block 512 of the DP 510 which operates to fetch instructions. After each instruction is fetched, it is decoded in parallel by the DP and by each PE in the array. In each device, a "mode-of-operation" bit in the instruction word is examined to determine the mode of operation (i.e. "PE" or "SP") in which the instruction should be executed. If the mode-of-operation bit is set to a logic "1", a PE mode of operation is indicated. If the mode-of-operation bit is set to a logic "0", an SP mode of operation is indicated If the PE mode of operation is indicated, every PE in the array, and the DP, acting as another processing element of the array, executes the instruction. If the SP mode of operation is indicated, only the DP, acting as the controlling element of the array, executes the instruction.

Figure 6:
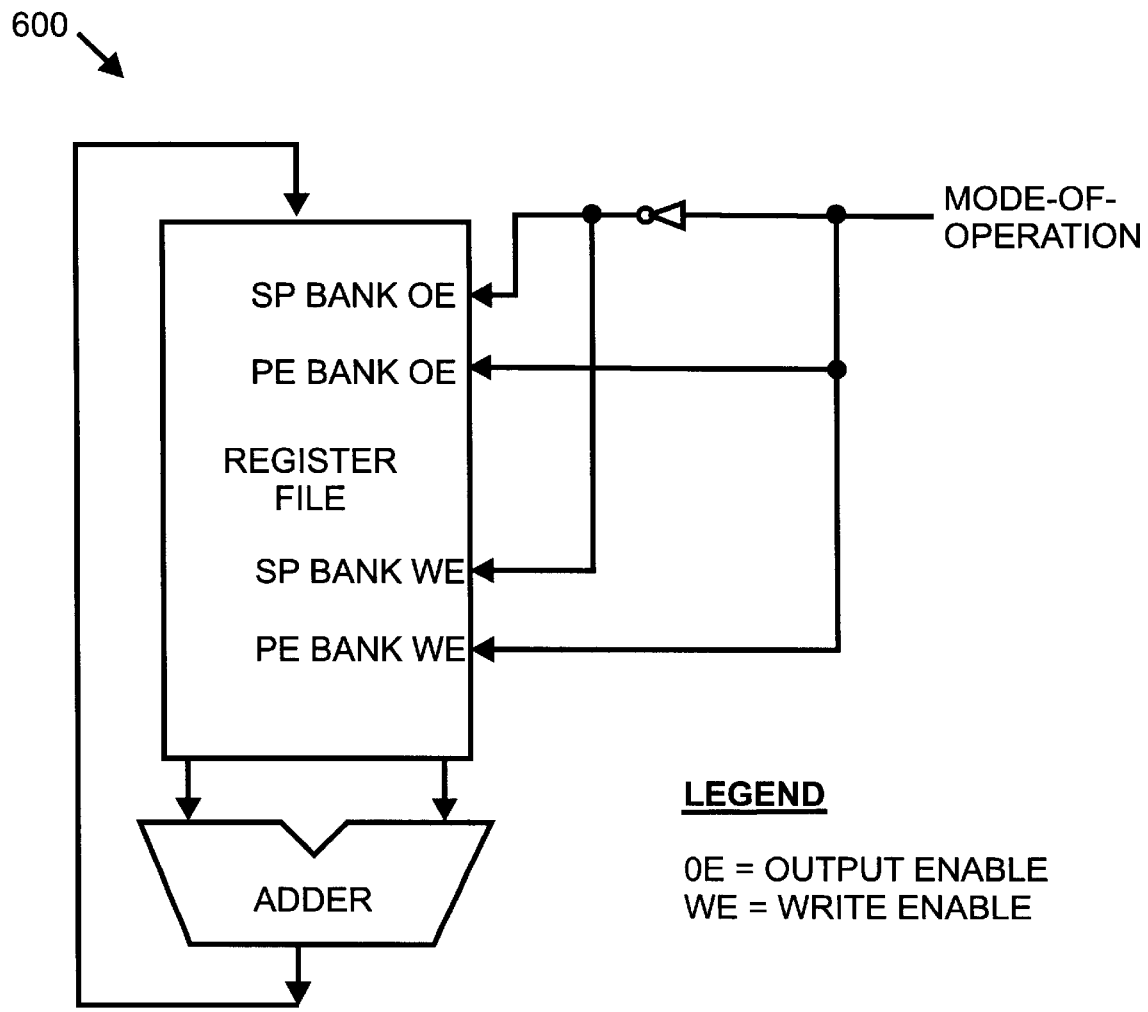
FIG. 6 illustrates a second register file selection mechanism in accordance with the present invention.

When an instruction is decoded in the DP, the mode-of-operation bit is also used to enable the appropriate register bank for the operation. For the example of the integer ADD instruction, the mode-of-operation bit is used to enable the register bank in which the source and destination registers are located. A logical view of a suitable register bank selection mechanism 600 is illustrated in FIG. 6. Register files are typically custom designed which might provide an advantage to the approach of FIG. 6 versus the approach of FIG. 4. This is an implementation and technology process decision.

Figure 7:
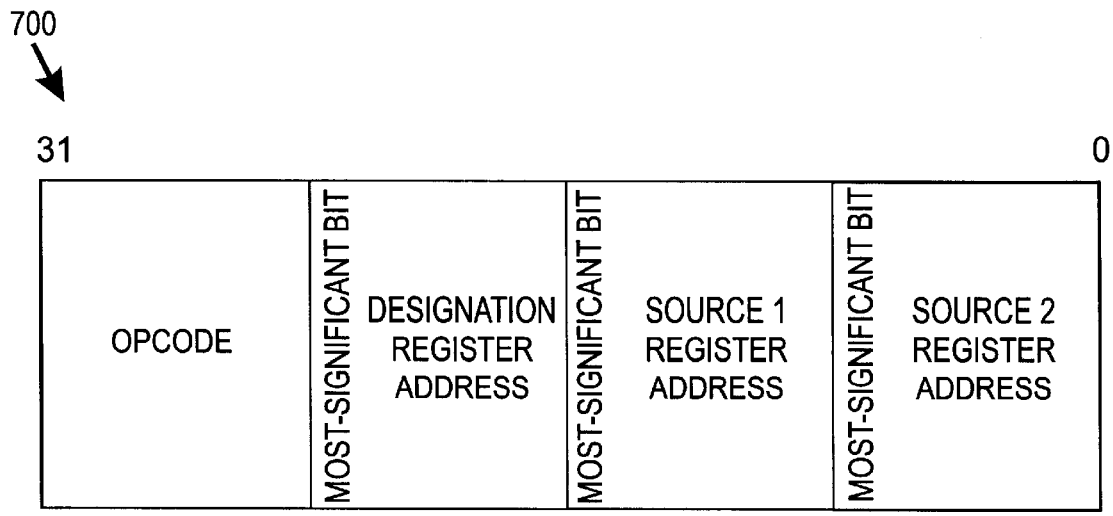
FIG. 7 illustrates an instruction format for use in conjunction with the array and register file selection mechanisms of FIGS. 5 and 6, respectively.

In third and fourth embodiments of the present invention, the DP, the array of PE's, and their interconnection network, are implemented in a manner similar to that described in the first and second embodiments of the present invention, respectively. Unlike the implementation of the first two embodiments, however, instead of using a "mode-of-operation" bit in the instruction to determine the register file, or bank, accessed by the DP (or PEs) during an operation, the most-significant bit (MSB) of the source and/or destination register addresses contained in the instruction is used. A suggested instruction format 700 for the operation of these embodiments is shown in FIG. 7.

Instruction processing begins with the instruction sequencer in the DP fetching instructions. As each instruction is fetched, it is decoded in parallel by the DP and by each PE in the array. In each device, the MSB of the source and/or target register addresses in the instruction word is examined to determine the mode of operation (i.e. "PE" or "SP") in which the instruction should be executed. If all of the MSBs are set to a logic "1", a PE mode of operation is indicated. If all of the MSBs are set to a logic "0", an SP mode of operation is indicated. If the PE mode of operation is indicated, all of the PEs in the array, and the DP, acting as another processing element of the array, execute the instruction. If the SP mode of operation is indicated, only the DP, acting as the controlling element of the array, executes the instruction.

Figure 8:
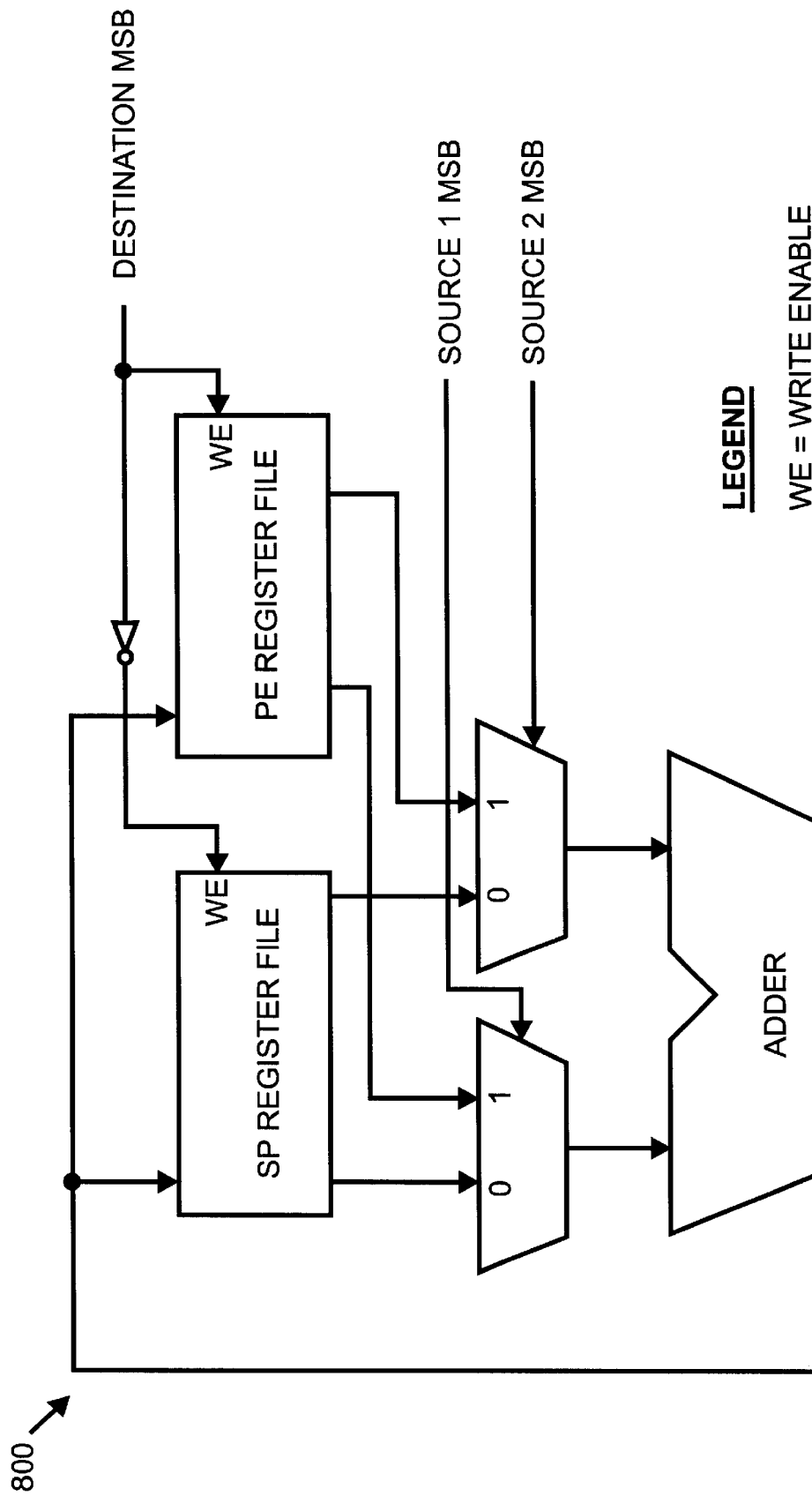
FIG. 8 illustrates an alternative register file selection mechanism.

However, if the instruction contains more than one register address (e.g. a source address and a destination address, or two source addresses and one destination address), and the MSBs in at least two addresses are not the same, then in an array processor consisting of a DP and multiple PEs the MSB of the Destination Register Address determines whether the instruction is a control or PE instruction. When such an instruction is decoded in the DP, the MSBs are used to select (or enable) the appropriate file (or bank) for the operation. For the example of the integer ADD instruction, the MSBs bit are used to select (or enable) the register files (or banks) in which the source and destination registers are located. A logical view of a suitable register file selection mechanism 800 is illustrated in FIG. 8.

The ability to share execution units in a controller combined with an array processing element allows controller SISD instructions to be executed concurrently with SIMD PE instructions. This is preferably accomplished using the ManArray iVLIW architecture. By using an SP/PE mode of operation bit in each simplex instruction, an iVLIW containing at least two simplex instructions can mix SP instructions with PE instructions. This powerful feature allows sequential code to be intermixed with highly parallel code thereby further optimizing performance in an array processor.

Figure 9:
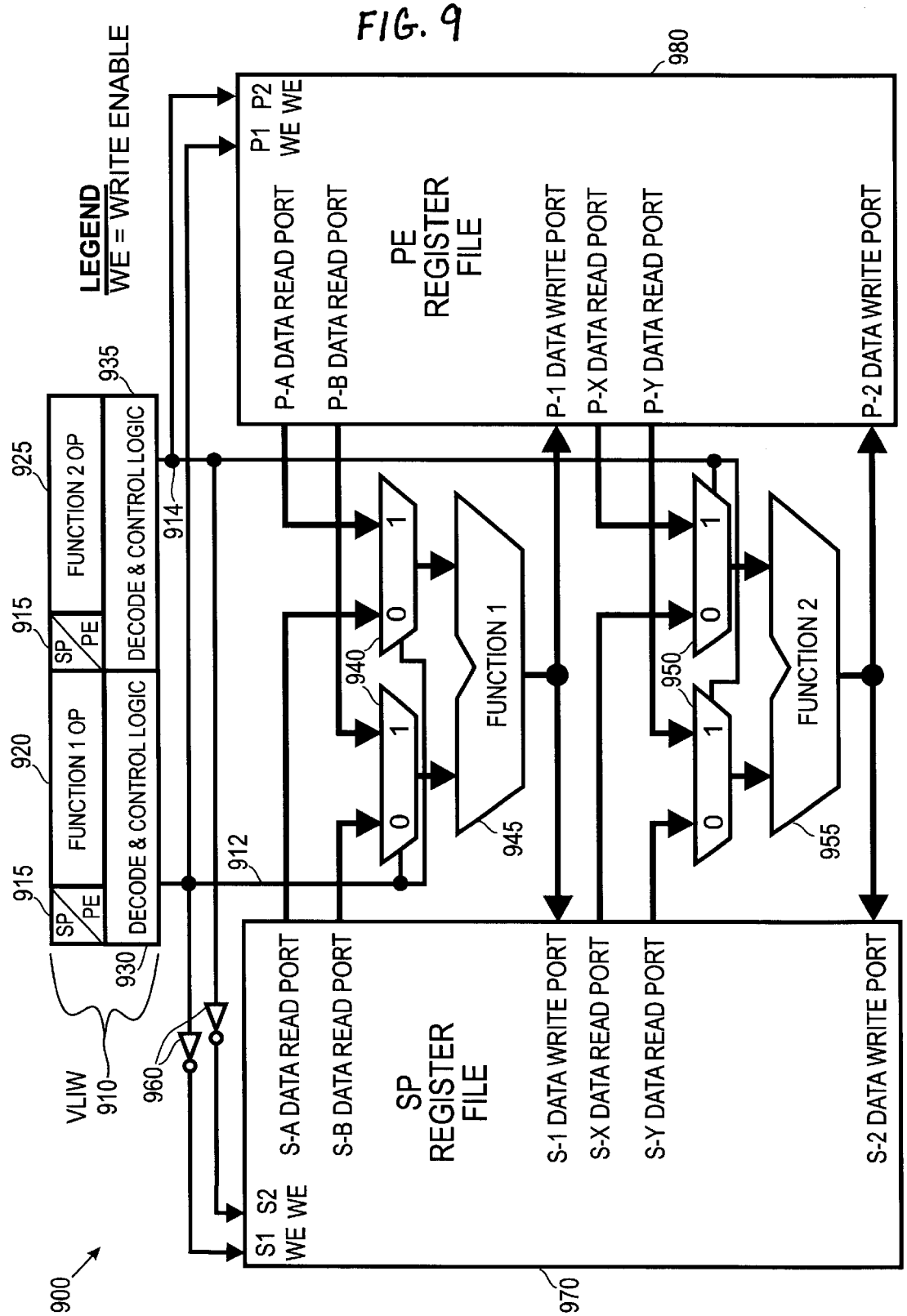
FIG. 9 illustrates the dynamic VLIW merge capability of the array controller with an array processing element.

Suitable apparatus to implement this is shown in FIG. 9 with two simplex instructions 920 and 925 indicated in FIG. 9 and where two function units 945 and 955 are also shown. In FIG. 9, a VLIW decode and control logic block 910 containing a minimum of two registered simplex instructions provides the write enable control signals 912 and 914 to the SP register file 970 and the PE register file 980. Signals 912 and 916 are generated from the decode and control logic block 930 and the signals 914 and 918 are generated from the decode and control logic block 935. The iVLIW simplex instruction mode-of-operation bit 915 (SP/PE) controls which register file the results from function 1 945 or function 2 955 are to be written, at the end of execution. The inverters 960 logically indicate a single level control over which register file is written to and controls operation so that only one register file is written to at a time. The multiplexers 940 and 950 control the source data path from the appropriate register file to the inputs of the functional units based upon multiplexer enable signals 916 and 918 respectively.

With this type of mechanism and a combined controller and processing element it is possible to intermix sequential controller instructions with highly parallel SIMD array PE instructions.

While the present invention has been disclosed in the context of a number of presently preferred embodiments, it will be recognized that many variations may be made to adapt the present teachings to other contexts consistent with the claims which follow.

We claim:

1. A method operating a merged processor including a control processor and a processing element, the method comprising the steps of:

(a) fetching a very long instruction word (VLIW) by the merged processor, the VLIW comprising:
(i) a first simplex instruction including a mode of operation bit defining the first simplex instruction as a control processor instruction, and
(ii) a second simplex instruction including a mode of operation bit defining the second simplex instruction as a processing element instruction;

(b) examining the mode of operation bit for each simplex instruction by the merged processor to determine if each simplex instruction is a control processor instruction or a processing element instruction;

(c) executing the first simplex instruction by the control processor; and (d) executing the second simplex instruction by the processing element;

wherein step (c) and step (d) are performed in parallel.

2. The method of claim 1 wherein the merged processor further includes a control processor register file and a processing element register file, wherein step (b) further comprises the step of:

examining the mode of operation bit for each simplex instruction by the merged processor to select the control processor register file or a processing element register file for each instruction.

3. The method of claim 1 wherein the merged processor further includes a register file including control processor bank and a processing element bank, wherein step (b) further comprises the step of:

examining the mode of operation bit for each simplex instruction by the merged processor to select the control processor bank or a processing element bank for each instruction.

* * * * *